US011514372B2

(12) United States Patent
Xu et al.

(10) Patent No.: US 11,514,372 B2
(45) Date of Patent: Nov. 29, 2022

(54) AUTOMATICALLY TUNING PARAMETERS IN A LAYERED MODEL FRAMEWORK (71) Applicant: Microsoft Technology Licensing, LLC, Redmond, WA (US)

(72) Inventors: Zhiyuan Xu, Mountain View, CA (US); Jinyun Yan, Sunnyvale, CA (US); Kinjal Basu, Sunnyvale, CA (US); Revant Kumar, Sunnyvale, CA (US); Onkar A. Dalal, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 640 days.

(21) Appl. No.: 16/557,823

(22) Filed: Aug. 30, 2019

(65) Prior Publication Data

US 2021/0065064 A1 Mar. 4, 2021

(51) Int. Cl.
*G06N 20/20* (2019.01)
*G06K 9/62* (2022.01)

(52) U.S. Cl.
CPC .............. *G06N 20/20* (2019.01); *G06K 9/623* (2013.01)

(58) Field of Classification Search
CPC ........ G06N 20/00; G06N 3/084; G06N 20/20; G06K 9/6267; G06K 9/623
See application file for complete search history.

(56) References Cited

U.S. PATENT DOCUMENTS

| 10,616,369 | B1 * | 4/2020 | d'Andrea | G06N 20/00 |
| 2018/0089591 | A1 * | 3/2018 | Zeiler | G06F 8/65 |
| 2018/0276561 | A1 * | 9/2018 | Pasternack | G06F 16/353 |
| 2019/0121673 | A1 * | 4/2019 | Gold | G06T 1/60 |
| 2019/0222672 | A1 * | 7/2019 | Greenberg | H04L 67/02 |
| 2019/0311287 | A1 * | 10/2019 | Chew | G06Q 30/0202 |
| 2020/0012962 | A1 * | 1/2020 | Dent | G06F 9/5011 |
| 2021/0227298 | A1 * | 7/2021 | Talkhoonche | H04N 21/44204 |

OTHER PUBLICATIONS

Agarwal, et al., "Online Parameter Selection for Web-based Ranking Problems", In Proceedings of the 24th ACM SIGKDD International Conference on Knowledge Discovery & Data Mining, Aug. 19, 2018, pp. 23-32.

* cited by examiner

Primary Examiner — Abdullahi E Salad
(74) Attorney, Agent, or Firm — NDWE, LLP (57) ABSTRACT Techniques are provided for automatically tuning a parameter in a layered model framework. One or more machine learning techniques are used to train multiple versions of a first model that includes a first version and a second version. A second model is stored that includes a parameter and accepts, as input, output from the first model. Multiple parameter values of the parameter are tested when processing content requests using the first and second versions of the first model. A strict subset of the plurality of parameter values are selected for the parameter of the second model, such that processing a first subset of the content requests using the first version of the first model results in a first value of a particular metric that matches a second value of the particular metric resulting from processing a second subset of the content requests using the second version of the first model.

20 Claims, 4 Drawing Sheets

AUTOMATICALLY TUNING PARAMETERS IN A LAYERED MODEL FRAMEWORK

TECHNICAL FIELD

The present disclosure relates generally to machine learning and, more particularly, to automatically tuning parameters in a layered model framework where one or more models are chained together.

BACKGROUND

The Internet has allowed users all over the world to access content of many types: audio, video, text, graphics, etc. Content platforms seek to attract users by providing the most relevant content, which may vary from one user to another. However, with the variation in preferences of different users and the plethora of content that may be presented to any individual user, content platforms have found it difficult to determine the most relevant content to present in response to a user request.

To address this problem, content platforms have developed sophisticated models (often machine-learned models) to determine which content is most relevant on a per request and/or per user basis. For some content platforms, multiple models are leveraged for a single request in order to select a small subset of all available content items. For example, a first set of models, each for a different type of content, is developed and used to select, in response to a single user request, a set of content items, while another model is developed and used to score each content item in each selected set. As another example, a first model is used to determine which content items will achieve a first objective, a second model is used to determine which content items will achieve a second objective, and a third model combines the results of each of the first two models to provide a unified score for the content items.

The accuracy of a model depends on the features upon which the model is based and the quality of the training data used to train the model. From time to time, model developers add features to, remove features from, and/or change features of a model. In order to determine whether an updated version of the model results in better performance (according to one or more metrics) than a current version, the updated version may be tested in a real-world production environment. The results of the updated version are compared to the results of the current version to determine which version performed best. However, in a layered model framework where the output of an upstream model is input to a downstream model, it is not clear from the results of the downstream model which version of an upstream model performed best. For example, results of the downstream model that takes input from a second version of an upstream model indicate a higher user selection rate than results of the downstream model that takes input from a first (or prior) version of the upstream model. The higher user selection rate may be due to better quality content items being identified by the second version or may be due to fewer impressions of content items of a certain type. It is difficult to isolate the performance of the upstream model from the performance of the downstream model.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for automatically tuning one or more parameters in a layered model framework are provided. In one technique, multiple versions of a first model are trained using one or more machine learning techniques. A second model is stored that includes a particular parameter and that accepts, as input, output from the first model. Multiple parameter values of the particular parameter of the second model are tested when processing content requests using the different versions of the first model. A strict subset of the parameter values for the parameter of the second model are selected such that processing a first subset of the content requests using the first version of the first model results in a first value, of a particular metric, that matches (or nearly matches) a second value of the particular metric resulting from processing a second subset of the content requests using the second version of the first model.

Embodiments improve the computer technology of automatically tuning one or more parameters of a downstream model that is used when processing content requests. Embodiments reduce the manual effort required in prior approaches through automatically testing multiple parameters simultaneously and using automatic techniques to learn the appropriate parameter value(s) in order to confidently evaluate different versions of an upstream model. It is suboptimal to pick parameters manually for multiple reasons. First, it is time consuming to validate each parameter through online A/B tests and, therefore, experimentation velocity is significantly reduced. Second, the parameter selected may not be the optimal value. Third, the optimal value could change over time, which cannot be captured by the manual process.

System Overview

Figure 1:
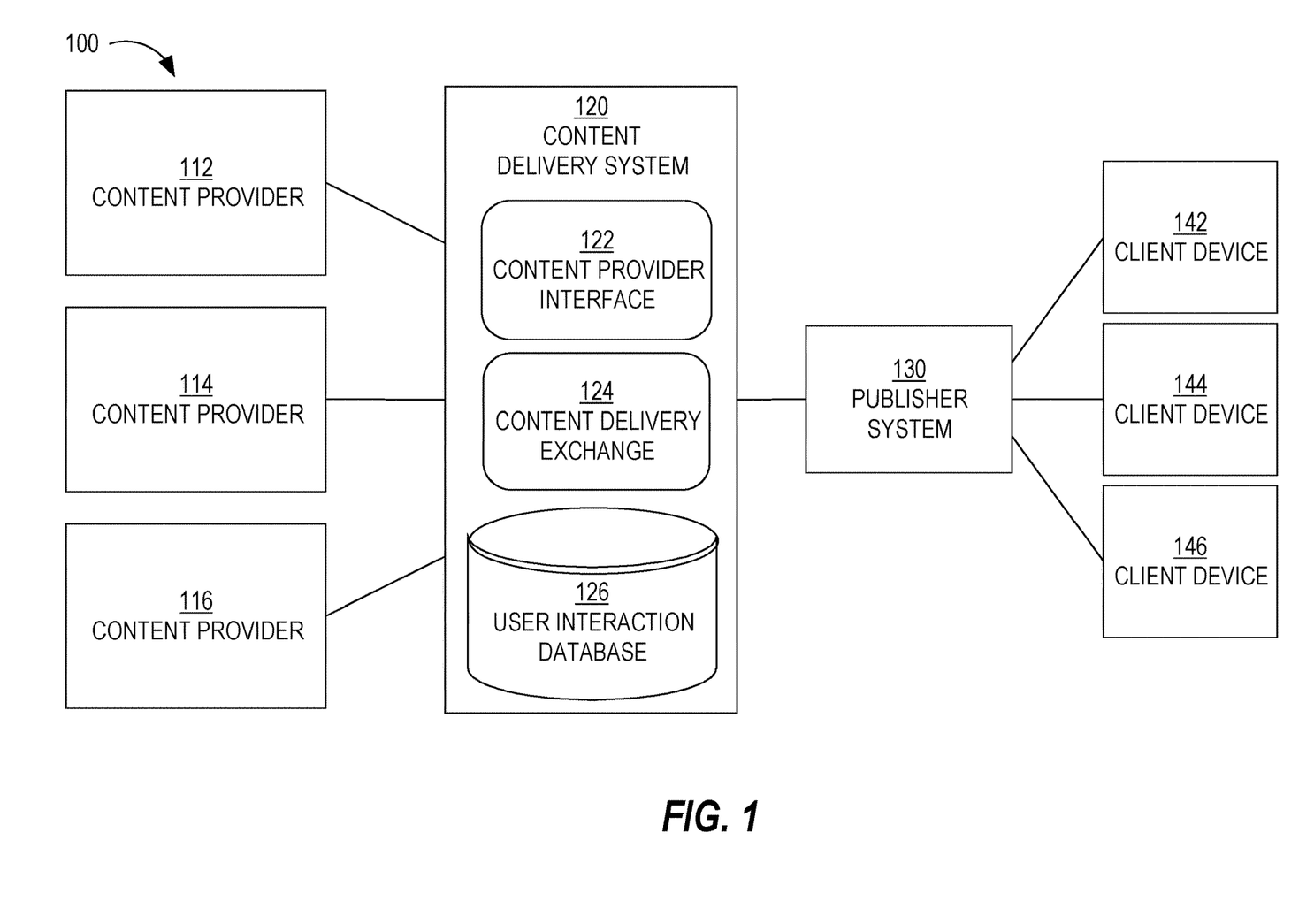
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to content item, across client devices 142-146 (and other client devices not depicted). For example, content delivery system 120 determines whether a content item that content delivery exchange 124 delivers is presented at (e.g., displayed by or played back at) a client device. Such an "event" is referred to as an "impression." As another example, content delivery system 120 determines whether a user interacted with a content item that exchange 124 delivered to a client device of the user. Examples of "user interaction" include a view or a selection, such as a "click." Content delivery system 120 stores such data as user interaction data, such as an impression data set and/or a interaction data set. Thus, content delivery system 120 may include a user interaction database 126. Logging such events allows content delivery system 120 to track how well different content items and/or campaigns perform.

For example, content delivery system 120 receives impression data items, each of which is associated with a different instance of an impression and a particular content item. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, an interaction data item may indicate a particular content item, a date of the user interaction, a time of the user interaction, a particular publisher or source (e.g., onsite v. offsite), a particular client device that displayed the specific content item, and/or a user identifier of a user that operates the particular client device. If impression data items are generated and processed properly, an interaction data item should be associated with an impression data item that corresponds to the interaction data item. From interaction data items and impression data items associated with a content item, content delivery system 120 may calculate an observed (or actual) user interaction rate (e.g., CTR) for the content item. Also, from interaction data items and impression data items associated with a content delivery campaign (or multiple content items from the same content delivery campaign), content delivery system 120 may calculate a user interaction rate for the content delivery campaign. Additionally, from interaction data items and impression data items associated with a content provider (or content items from different content delivery campaigns initiated by the content item), content delivery system 120 may calculate a user interaction rate for the content provider. Similarly, from interaction data items and impression data items associated with a class or segment of users (or users that satisfy certain criteria, such as users that have a particular job title), content delivery system 120 may calculate a user interaction rate for the class or segment. In fact, a user interaction rate may be calculated along a combination of one or more different user and/or content item attributes or dimensions, such as geography, job title, skills, content provider, certain keywords in content items, etc.

Multi-Model System

Figure 2:
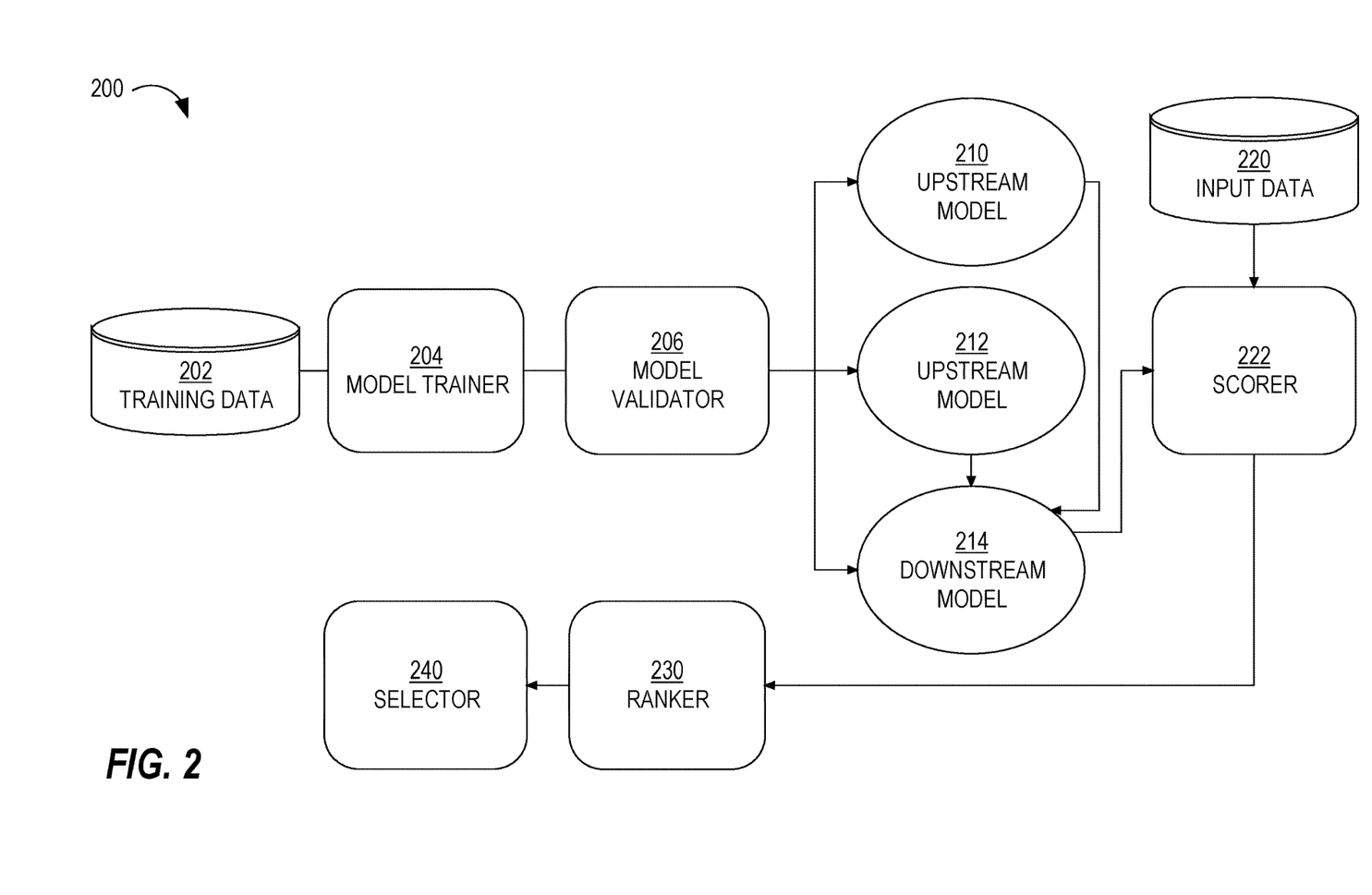
FIG. 2 is a block diagram that depicts an example multi-model system for processing content requests, in an embodiment.

FIG. 2 is a block diagram that depicts an example multi-model system 200 for processing content requests, in an embodiment. System 200 may be part of publisher system 130 or a system that is affiliated with publisher system 130. System 200 includes training data 202, model trainer 204, model validator 206, upstream models 210-212, a downstream model 214, input data 220, a scorer 222, a ranker 230, and a selector 240. Each of model trainer 204, model validator 206, scorer 222, ranker 230, and selector 240 may be implemented in software, hardware, or any combination of software and hardware. Even though these elements are depicted individually, implying that each element is implemented on a single device, one or more of these elements may be implemented on multiple computing devices.

Upstream models 210-212 may be rule-based models or machine-learned models. In the depicted example, upstream models 210-212 are trained based on training data 202. Although two upstream models 210-212 are depicted, system 200 may include more or fewer upstream models.

Training data 202 may include data that is generated by processing raw data (not depicted), such as profile data of users, attribute data of content items, attribute data of content delivery campaigns, attribute data of content providers, and online interaction data between users and content items. Examples of processing include aggregating raw data (e.g., finding the mean, median, minimum, and/or maximum value based on multiple raw values), transforming raw data into a different format (e.g., changing from one date/time format to another date/time format), and mapping raw data to standardized data (e.g., mapping a company name to an entity identifier, mapping a skill name to a skill identifier, mapping a job title name to an vector representation).

Machine-Learning

In an embodiment, one or more of models 210-214 are generated based on training data using one or more machine learning techniques. Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on a history of attribute values associated with users and regions. The statistical model is trained based on multiple attributes (or factors) described herein. In machine learning parlance, such attributes are referred to as "features." To generate and train a statistical model, a set of features is specified and a set of training data is identified.

Embodiments are not limited to any particular machine learning technique for generating a model. Example machine learning techniques include linear regression, logistic regression, random forests, naive Bayes, and Support Vector Machines (SVMs). Advantages that machine-learned models have over rule-based models include the ability of machine-learned models to output a probability (as opposed to a number that might not be translatable to a probability), the ability of machine-learned models to capture non-linear correlations between features, and the reduction in bias in determining weights for different features.

A machine-learned model may output different types of data or values, depending on the input features and the training data. For example, training data may comprise, for each user, multiple feature values, each corresponding to a different feature. In order to generate the training data, information about each user is analyzed to compute the different feature values. In this example, the dependent variable or label of each training instance may be whether the user selected a content item. Additionally or alternatively, the dependent variable of each training instance may indicate how long the corresponding content item was presented to the user.

Initially, the number of features that are considered for training may be significant. After training a model and validating the model, it may be determined that a subset of the features have little correlation or impact on the final output. In other words, such features have low predictive power. Thus, machine-learned weights for such features may be relatively small, such as 0.01 or −0.001. In contrast, weights of features that have significant predictive power may have an absolute value of 0.2 or higher. Features will little predictive power may be removed from the training data. Removing such features can speed up the process of training future models and scoring content items.

Multi-Model System: Model Training

Model trainer 204 implements one or more machine learning techniques to train a model based on a set of features for the model. Input to model trainer 204 may be a set of features, a portion of training data 202, and training parameters. Example training parameters include learning rate, regularization, iteration, and termination tolerance. A characteristic of values of such parameters is that the values do not change while the computer model is trained.

In computer modeling, "learning rate" refers to a constant used in error backpropagation learning and other artificial neural network learning algorithms to affect the speed of learning. The mathematics of backpropagation are based on small changes being made to the weights at each step. If the changes made to weights are too large, then the algorithm may "bounce around" the error surface in a counter-productive fashion. In this case, it is necessary to reduce the learning rate. On the other hand, the smaller the learning rate, the more steps it takes to get to a stopping criterion. Example values of the learning rate parameter include 0.1, 1, 10, 100, 1000, etc.

"Regularization" refers to a process of introducing additional information in order to prevent overfitting. Overfitting occurs when a model describes random error or noise instead of the underlying relationship. Overfitting generally occurs when a model is excessively complex, such as having too many features relative to the number of observations. A model that has been over fit will generally have poor predictive performance, as it can exaggerate minor fluctuations in the data. The additional information introduced through regularization (e.g., L1 regularization or L2 regularization) is usually of the form of a penalty for complexity, such as restrictions for smoothness or bounds on the vector space norm.

An iteration (or "epoch") refers to a complete pass through all of the training data. The weights in the model (e.g., a neural net) may be updated after each data item (or row) in the training data is presented to the model. Alternatively, the weights may be updated just once at the end of the iteration. The number of iterations is used as a measure of the speed of learning. Possible values for the iteration parameter are whole numbers greater than 0.

In an embodiment, a user who is responsible for building a computer model specifies values for each of multiple parameters. After training and validating one computer model, it is determined (whether manually or automatically), based on one or more performance metrics associated with the computer model, whether to deploy the computer model or to train and validate another computer model. Alternatively, a user may specify multiple sets of parameter values, each set for training a different computer model. In this way, multiple computer models may be generated simultaneously. However, in either approach, the user specifying the set(s) of training parameter values requires knowledge of what those training parameters mean and what range of values for each training parameter is acceptable.

In an alternative embodiment, one or more training parameter values are pre-defined and used to train one or more computer models. The training parameter values are defined prior to a user initiating generation of the one or more computer models. The training parameter values may have been defined by a user that is different than the user initiating the model generation and different than the user who defined the data to be extracted from raw data sources and stored as training data 202.

In a related embodiment, multiple sets of training parameter values are stored. Each set of training parameter values is used to generate and train a different computer model. For example, a first computer model is generated based on a learning rate of two and a second computer model is generated based on a learning rate of three. The same training data is used to generate each computer model.

Model validator 206 validates models trained by model trainer 204. Validation involves running a model against training-type data, which results in the model making multiple predictions (e.g., generating scores or classifications). The predictions are then compared to the actual or known answers. Model validator 206 generates one or more performance metrics. Example performance metrics include AUC (Area Under of the Curve), accuracy (ACC), average precision (APR), and Precision (PRE). If the user that initiated building of the computer model(s) is sophisticated enough, then the more metrics that are provided to the user, the more information the user has to make an informed decision about whether the computer model(s) is/are sufficient and, if multiple, which computer model to select. Model validation may be performed by the same computing job as computing the job that initiated generation of the models or by a different job.

Multi-Model System: Layered Models

Models 210-212 are "upstream" relative to model 214; however, system 200 may include one or more models (not depicted) that are upstream relative to one or more of models 210-212. A first model is "upstream" relative to a second model if the output of the first model is input to the second model. Similarly, model 214 is "downstream" relative to upstream models 210-212. However, system 200 may include one or more models that are downstream relative to downstream model 214.

In this example, upstream models 210-212 and downstream model 214 are depicted as being trained based on training data 202. However, the different models may be trained based on a different sets of training data, which may be stored at a single storage location or at different storage locations. For example, upstream model 210 may be trained based on a first portion of training data 202 that existed at time T1 while upstream model 212 is trained based on a second portion of training data 202 that existed at time T2 and, therefore, is different than the first portion. As another example, the type of training data that downstream model 214 is trained upon may be very different than the training data upon which upstream models 210-212 are based.

Multi-Model System: Ranking and Selecting Content Items

Input data 220 is data that is input to scorer 222 in order to generate output, such as a score for a particular data item that represents a content item or an entity, such as a user or organization. Example input may be entity data (including features about a person and/or a company) and content item data (including features about a specific content item, a specific campaign that includes the content item, and/or a provider of the content item).

Scorer 222 reads the input from input data 220 and invokes one or more of models 210-214, each of which generates output. Scorer 222 uses output from one of upstream models 210-212 as one of the inputs to downstream model 214, which generates output. Additionally, scorer 222 may use data from input data 220 as one of the inputs along with the output from one of upstream models 210-212 to generate output, or a score. Thus, the input to downstream model 214 may be a different type of input than the input to upstream models 210-212.

Ranker 230 ranks a set of data items (e.g., content items) that are individually scored by scorer 222. Thus, ranker 230 may order the set of data items in descending order with the highest scored data item listed first, or may order the set of data items in ascending order with the lowest scored data item listed first.

Selector 240 selects a subset of the set of data items based on the ranking and/or scores. For example, selector 240 selects the top N content items from the set of content items. As another example, selector 240 selects the top N content items, as long as the score of the respective content item is above a particular threshold. Thus, the input to selector 240 may be the ordered or ranked set of content items and a value that indicates N and/or a value that indicates the particular threshold.

In a related embodiment, the logic or functionality of scorer 222, ranker 230, and selector 240 is encapsulated in a single program or process rather than three different programs or processes.

At least one of upstream models 210-220 is associated with multiple versions. Different versions of an upstream model may be based on the same features or different features. Also, different versions of an upstream model may be associated with different coefficients, or feature weights, of a particular feature that appears in the different versions. Thus, two versions of the same upstream model may be based on the same features but may be trained using different training data and/or different machine learning techniques.

Testing Different Values for a Parameter of a Downstream Model

Figure 3:
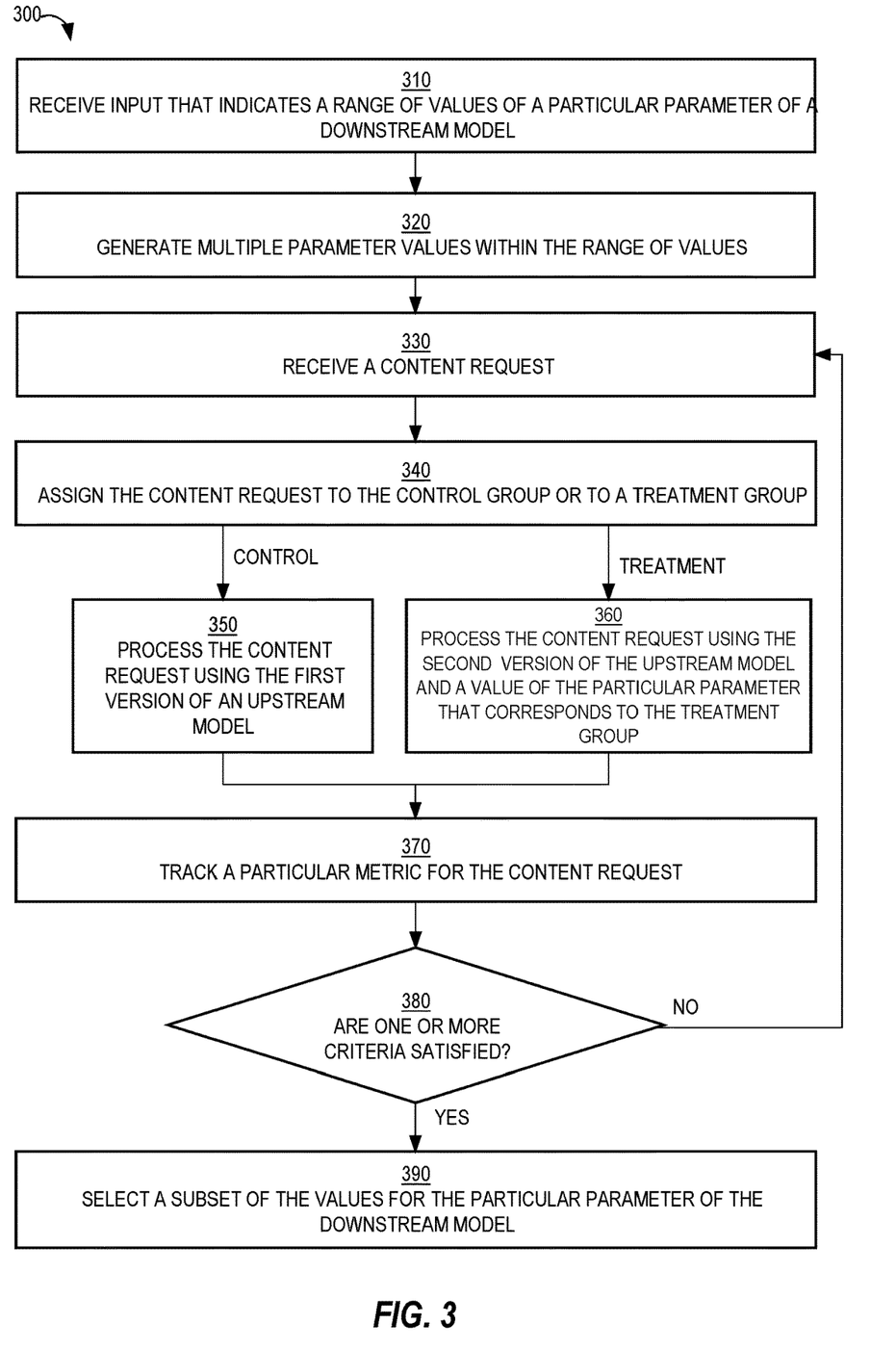
FIG. 3 is a flow diagram that depicts an example process for isolating the effects of different versions of an upstream model, in an embodiment.

FIG. 3 is a flow diagram that depicts an example process 300 for isolating the effects of different versions of an upstream model, in an embodiment. Not all of the blocks of process 300 need to be performed and some blocks may be performed in a different order than what is described herein and depicted in FIG. 3. Process 300 may be performed by different components of system 100 and/or system 200.

Process 300 may be performed only after a new version of an upstream model is trained. Alternatively, process 300 may be performed multiple times for a single version of the upstream model.

At block 310, input is received that indicates a range of parameter values of a particular parameter of a downstream model, such as downstream model 214. The input may be received through a user interface and may be specified by a developer of downstream model 214. The range may be two parameter values (e.g., 0.9 and 1.3) that indicate a minimum value and a maximum value. Alternatively, the range may be a middle parameter value and, optionally, a step-wise value, and/or a total count value, such as 1.0, 0.01, and 50, where 1.0 is the middle parameter value, 0.1 is the step-wise value, and 50 is the total count value, indicating the total number of parameter values to test.

At block 320, based on the range of parameter values, multiple parameter values that are within the range of values are automatically generated. The total number of parameter values may be hard-coded, may be specified in the input, or may be inferred based on the input. For example, 50 may be a default number of parameter values to test, regardless of the range of parameter values indicated in the input. As another example, the smaller the range of parameter values indicated in the input, the fewer the number of parameter values are generated.

Also, the step-wise value may be a default value or may be indicated in the input, as indicated in the example above. In that example (i.e., 1.0, 0.01, and 50), approximately 25 parameter values above 1.0 are automatically generated and approximately 25 parameter values below 1.0 are generated, each separated by 0.01. Thus, the parameter values generated in this example would include {0.97, 0.98, 0.99, 1.0, 1.01, 1.02}.

At block 330, a content request is received. The content request may originate from one of client devices 142-146. The content request may be received at publisher system 130 or content delivery exchange 120.

At block 340, the content request is assigned to a treatment group or a control group. The control group corresponds to a first (or current) version of an upstream model. Such a version may represent a stable version or a version whose performance is acceptable.

The assignment to a treatment group or to the control group is based on the amount or percentage of traffic that each group is to process. For example, the control group may be assigned 95% of the traffic and the remaining 5% of traffic is divided equally among the treatment groups. If there are 50 treatment groups, then each treatment group is assigned about 0.1% of the traffic. Each treatment group corresponds to a different generated parameter value.

Group assignment may be performed in a round-robin way. For example, the first 95 content requests are assigned to the control group and the next 5 content requests are assigned to different treatment groups. The next 95 content requests are assigned to the control group and the next 5 content requests are assigned to treatment groups to which no content request has been assigned; and so forth.

Alternatively, group assignment may involve a random or semi-random process. For example, a random number generator is invoked to generate a random number. Then, a modulo operation is performed on the random number to generate a value within a particular range of values. The control group may be assigned a first sub-range of the particular range and each treatment group may be assigned a different (non-overlapping) sub-range of the particular range. The size of each sub-range may correspond to the amount or percentage of traffic that each treatment and control group is to process. For example, the control group may be assigned values 0-949 (representing 95% of the traffic) and each treatment group is assigned a different value from 950-999 (representing 5% of the traffic).

If the content request is assigned to the control group, then process 300 proceeds to block 350; else, process 300 proceeds to block 360.

At block 350, the content request is processed using the first (or current) version of an upstream model, such as upstream model 210. Here, the parameter value of downstream model 214 is fixed for all content requests that are processed using the first version of the upstream model. The parameter value may have been determined previously when testing the first version of the upstream model.

At block 360, the content request is processed using (1) the second version of the upstream model and (2) a parameter value, of the particular parameter of the second (or downstream) model, that corresponds to the treatment group.

At block 370, for each content request that is processed, a particular metric is tracked. The particular metric may vary from model to model or from domain to domain. An example metric is number of impressions of content items of a particular type. For example, for a first content request, 10 impressions of content items of the particular type are presented on a client device that initiated the first content request while, for a second content request, 27 impressions of content items of the particular type are presented on a client device that initiated the second content request. Other example metrics include a number of clicks, whether a conversion occurred, whether another type of action occurred, and a length of a user session associated with the content request.

Block 370 may involve storing a value of the particular metric in storage, whether volatile or non-volatile. The value may be stored in a record that is associated with the content request. The record may include not only the value of the particular metric, but also a request identifier that uniquely identifies the content request, a device identifier that uniquely identifies the client device that initiated the content request, a timestamp that indicates a date and/or time of receipt of the content request, and a user identifier that uniquely identifies a user that operates the client device.

At block 380, it is determined whether one or more criteria are satisfied. Examples of the one or more criteria include the lapse of a particular time period and the number of content requests that have been processed thus far for the current experiment. For example, if the current experiment (involving the control group and the treatment groups) has been active for 24 hours, then the one or more criteria are satisfied. As another example, if ten thousand requests have been processed for the current experiment, then the one or more criteria are satisfied. As another example, if each treatment group has been assigned at least one thousand content requests, then the one or more criteria are satisfied.

If the one or more criteria are satisfied, then process 300 proceeds to block 390. Otherwise, process 300 returns to block 330, where another content request is received.

At block 390, a strict subset of the plurality of parameter values are selected for the particular parameter of the downstream model. The strict subset (e.g., one parameter value) is selected such that processing a first subset of the content requests using the first version of the upstream model results in a first value of an aggregated metric that matches a second value of the particular metric resulting from processing a second subset of the content requests using the second version of the upstream model. In the example where the particular metric is number of impressions of content items of a particular type, the aggregated metric for a value of the particular parameter may be average (or median) number of such impressions when the value is used in the second version of the upstream model.

Block 390 may be performed in a number of ways, which are described in more detail herein.

Finding a Minimizer

The parameter value(s) selected for the particular parameter of the downstream model in order to properly evaluate two versions of an upstream model may be determined in one or more ways. In order to determine which value of the particular parameter to use in order to compare the corresponding treatment model to the control model, difference data pertaining to the aggregated metric of each treatment model and the control model is calculated. For example, an aggregated metric is calculated for each treatment model (and, therefore, for each parameter value that is tested) and for the control model. Then, a difference between the aggregated metric of the control model and the aggregated metric of each treatment model is calculated. The parameter value of the treatment model associated with the lowest absolute difference (e.g., 0) is referred to as the "minimizer" and is selected as the parameter value to use in order to compare the first version of the upstream model to the second version of the upstream model. In other problem domains, a goal may be find the maximizer in order to evaluate two versions of an upstream model.

Finding the Minimizer Using Linear Regression

Finding a minimizer (or maximizer) may be performed in one or more ways. One approach is to fit a function to a set of data points, each representing a difference between an aggregated metric of the control model and an aggregated metric of a different treatment model.

Any technique to fit a function to a set of data points may be used. Linear regression and the Gaussian process are just two of them. Linear regression is illustrated as follows in the context of the objective to align the overall number of impressions of content items of a particular type (referred to herein as "SU impressions") using different versions of the upstream model. To evaluate the performance of different versions of the upstream model, it is important to ensure that, with the new version, the number of SU impressions remains constant. To achieve this, the value of the particular parameter (referred to as LCF in this example) of the downstream model is calculated to "adjust" (e.g., by multiplying a factor) the predicted scores of the new version.

$SU_{imp-c}$ denotes the number of SU impressions of the control model, which refers to the downstream model that takes, as input, output from a current (or prior) version of the upstream model. $SU_{imp-t}$ denotes the number of SU impressions of a treatment model, which refers to the downstream model that takes, as input, output from a new (or different) version of the upstream model. $SU_{imp-t}(LCF)$ denotes the number of SU impressions of a particular treatment model, which refers to the downstream model that takes, as input, output from a new (or different) version of the upstream model, and where the value of particular parameter being tested is LCF. $SU_{imp-t}(LCF)$ is a function of LCF. An objective is to find LCF* so that LCF*=$\mathrm{argmin}_{LCF}|SU_{imp-t}(LCF) - SU_{imp-c}|$.

To solve this, the relationship between $\Delta = SU_{imp-t}(LCF) - SU_{imp-c}$ and LCF is understood by finding a function $f$, s.t., $\Delta = f(LCF)$. As noted above, one approach to estimating the function $f(\ )$ is using Linear Regression. The following describes a process for fitting a curve based on observed SU impressions using linear regression and returning the optimal LCF value.

The following notation is used:
  a. $x_i$ is a scaling factor
  b. $SU_{imp-t}$ denotes the SU impression normalized by the number of unique requests for a treatment model
  c. $SU_{imp-c}$ denotes the SU impression normalized by the number of unique requests for the control model
  d. $f(x_i)$ denotes a function to model the average SU impression ($SU_{imp}$) change related to the control model SU impression (SU)
  e. $f(x_i)$ denotes a function to model the average SU impression ($SU_{imp}$) change related to the control model SU impression (SU)
  f. $Y(x)$ denotes the observed SU impressions, where $Y(x) = \beta_0 + \beta_1 x + \epsilon$
  g. $f_c$ denotes the current SUimp
  h. 1 denotes a threshold between 0 and 1.

The input to the linear regression process is $\{x_i\}$, where i=1, 2, . . . , n (e.g., n=100)

The output is $x_k$, where $x_k = \mathrm{argmax}_{x \in \{xi\}} - (f(x) - f_c)^2$
  a. do
    i. process content requests using $\{x_1, x_2, \ldots, x_n\}$
    ii. collect observed SU impression $Y(x_1), Y(x_2), \ldots, Y(x_n)$
    iii. fit linear regression $f(x|\{x_i, y_i\}_{i=1}^{n})$ to get $\hat{\beta}_1$ and $\hat{\beta}_0$
    iv. Calculate $x^* = (f_c - \hat{\beta}_0)/\hat{\beta}_1$, where $x^* = \arg\max_{x \in \{x_i\}} - (f_j(x) - f_c)^2$
    v. $\mathrm{var}(x^*) = (\hat{\beta}_0/\hat{\beta}_1)^2 * (\hat{\mathrm{Var}}(\hat{\beta}_0)/(\hat{\beta}_0^2) - 2*\hat{\mathrm{Cov}}(\hat{\beta}_0, \hat{\beta}_1)/(\hat{\beta}_0 * \hat{\beta}_1) + \hat{\mathrm{Var}}(\hat{\beta}_1)/(\hat{\beta}_1^2))$
  b. while $\mathrm{var}(x^*) > 1$
  Return ($x^*$)

Finding the Minimizer Using a Gaussian Process

In an embodiment, a Gaussian process (GP) is used to find a function that fits a set of data points. GP takes into account mean and variance of each data point. In the following example, the data point is a value that is based on a difference between (1) an average number of SU impressions given a treatment model and an LCF value and (2) an average number of SU impressions given a control model. An absolute value of the difference may be determined.

For each data point or LCF parameter value, multiple values may be sampled, such as ten thousand. Such a sampling may be performing by selecting actual data collected from the experiment or may be based on the mean and variance of the collected data. GP may be used to fit a curve for each set of data points, each corresponding to a different LCF value. Thus, if ten thousand values are sampled for each parameter value, ten thousand functions are generated using GP. GP provides a distribution for each parameter value.

Exploit

For each function, a parameter value that results in the minimum (e.g., absolute) difference is determined and recorded. The number of times (or percentage of times) that a parameter value is determined to be the minimizer is used to determine whether to select that parameter value for further testing, whether to drop that parameter value from further testing, or whether to stop testing. If a parameter value is the minimizer greater than a first threshold percentage of the time (e.g., over 50%), then the testing may end and the parameter value is selected for evaluating the treatment model given that parameter value for the control model. If the parameter value is the minimizer less than a second threshold percentage of the time (e.g., less than 3%), then the parameter value is dropped from further consideration. Testing may proceed if there is no parameter value that is the minimizer greater than the first threshold percentage of the time. If there are multiple parameter values that are minimizers with a threshold percentage of the time (e.g., between 5% and 50%), then only those parameter values are selected for further testing.

Example Auto-Tuning Process Using a Gaussian Process

The following describes, using mathematical notation, an example auto-tuning process using GP:

---

Notation: $x_i$ is a scaling factor. Denote $f(x_i)$ as the function to model the SU impression $SU_{imp}$;
$Y(x) = SU_{imp}(x) = f(x) + \epsilon$; denote $f_c$ as MME $SU_{imp}$.
Denote $l_1$ and $l_2$ as thresholds between 0 and 1. Define
$p_i^{(t)} = P(x_1 = \arg\max_{x \in \{x_i\}} - (f(x) - f_c)^2 | \{x_i, y_i\}_{i=1}^n)$, $i = 1, 2 \ldots, n$
Input: $\{x_i\}$, $i = 1, 2, \ldots, n$ (e.g. n = 100),
where $x_i \in U(\chi)$ and $\chi$ is parameter search domain.
Output: $x_k$ where $x_k = \arg\max_{x \in \{x_i\}} - (f(x) - f_c)^2$
do
  1) Generate $\rho$ from U(0,1).
    if $\rho < l_1$ or t == 0 then $$p_i^{(t)} = \frac{1}{n};$$

else
      $p_i^{(t)} = p_i^*$;
    Serve the system using $\{x_1, x_2, \ldots, x_n\}$ with corresponding probabilities $\{p_1^{(t)}, p_2^{(t)}, \ldots, p_n^{(t)}\}$.
  2) Collect observed SU impression $y_1, y_2, \ldots, y_n$.
  3) Fit Gaussian Process $(f(x|\{x_i, y_i\}_{i=1}^n)$.
  4) Draw samples $f_1, f_2, \ldots, f_N$ (e.g. N = 10,000) from $(f(x|\{x_i, y_i\}_{i=1}^n)$.
  5) Calculate posterior maximizers $x_j^* = \arg\max_{x \in \{x_i\}} - (f_j(x) - f_c)^2$, where $j = 1, 2, \ldots, N$.

---

6) Based on $\{x_j^*\}$, update the posterior probability $p_1^*, p_2^*, \ldots, p_n^*$ while $p_i < l_2$ for all $i = 1, 2, \ldots, n$
Return $x_k^*$ where $p_k \geq l_2$;

---

The two algorithms (one using linear regression (LR) and the other using GP) are similar, but the modeling approaches are different. Each algorithm has its advantages and disadvantages. If the underlying truth of $f(x)$ is roughly linear, then the algorithm using LR will perform better while the algorithm using GP may overfit the data, especially when the number of observed A is not big enough because the number of online experiments is usually limited. If the underlying truth of $f(x)$ is strictly non-linear, then the algorithm using GP will have more flexibility of fitting the data over the algorithm using LR.

Another advantage of the algorithm using GP is its flexibility and ability to provide visualization of posterior distribution of the value of the particular parameter (LCF in this example). In a non-Bayesian approach (such as LR), the posterior probability cannot be calculated because the distribution at each candidate parameter value is not known.

In some scenarios, multiple different parameter values result in being the minimizer a significant amount of the time. For example, 0.83 is a minimizer 45% of the time and 0.84 is the minimizer 48% of the time. In an embodiment, multiple parameter values are selected and used to evaluate the performance of different upstream models.

Automatically Adjusting the Value Range after One or More Tests

In some scenarios, one of the endpoints of a range of parameter values may be determined to be the minimizer. If this is the case, then the true minimum may be some other parameter value outside of the initial range of parameter values. For example, an initial range of parameter values is between 0.9 and 1.1. If it is determined, using techniques described herein, that the parameter value that is the minimizer is 0.9 (i.e., one of the endpoints of the range), then the true minimum may be less than 0.9.

In an embodiment, a range of the parameter values to test is automatically adjusted or expanded to test a new range of parameter values. In the example above where 0.9 is determined to be the minimizer, it may be determined to test parameter values in the range of 0.7 and 0.9.

In related embodiment, if the minimizer is not associated with a difference (i.e., between an aggregated metric of the control model and an aggregated metric of the treatment model that corresponds to the minimizer) that is 0 or near 0, then the minimizer is not part of the range. For example, if the parameter value of 0.9 results in a difference greater than a particular threshold (e.g., 0.2), then a new range that is determined and tested may be 0.6 and 0.8.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
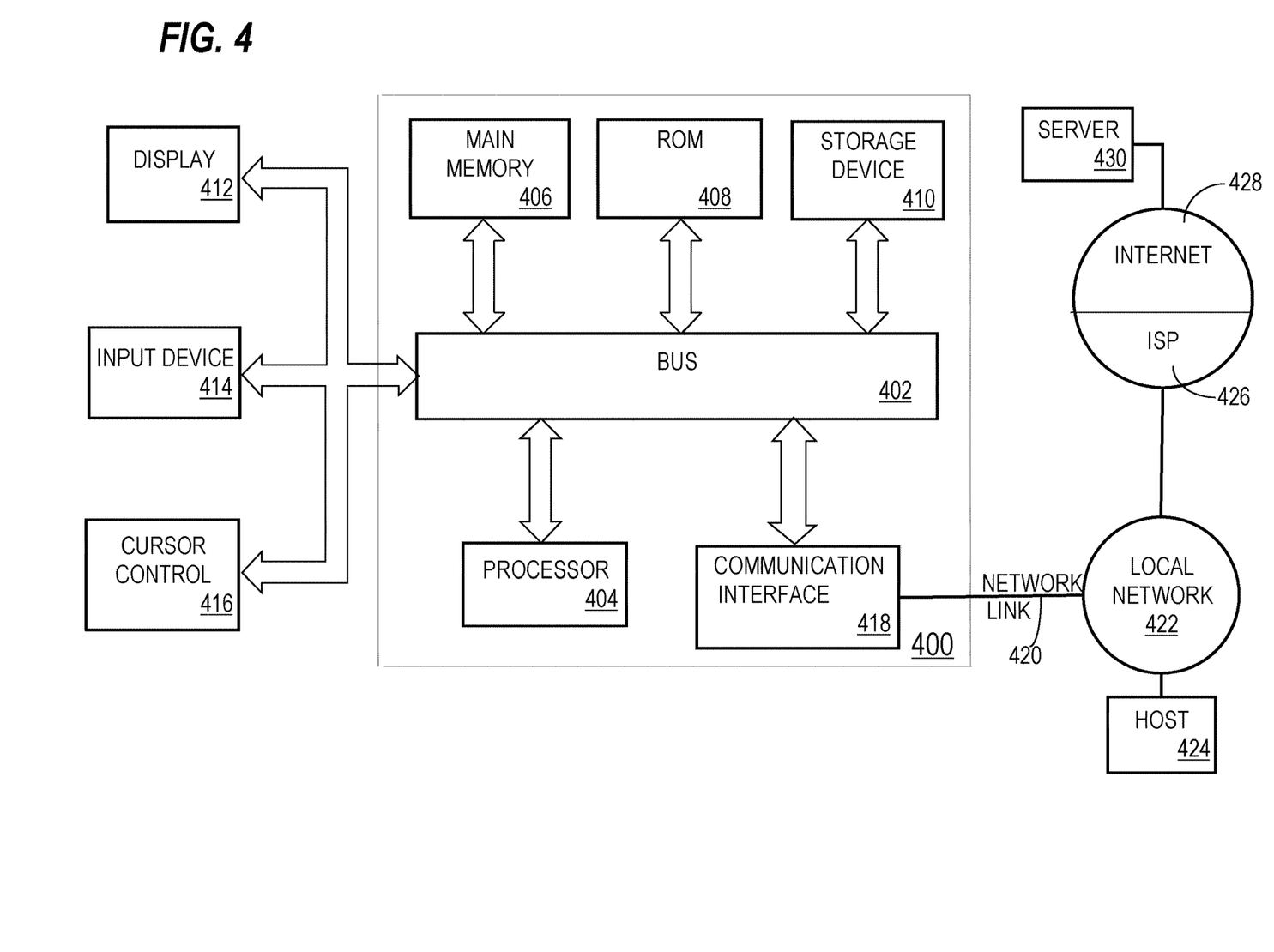
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    using one or more machine learning techniques to train a plurality of versions of a first model that includes a first version of the first model and a second version of the first model;
    storing a second model that includes a parameter and that accepts, as input, output from the first model;
    testing a plurality of parameter values of the parameter of the second model when processing a plurality of content requests using the first and second versions of the first model;
    selecting, for the parameter of the second model, a strict subset of the plurality of parameter values such that processing a first subset of the plurality of content requests using the first version of the first model results in a first value of a particular metric that matches a second value of the particular metric resulting from processing a second subset of the plurality of content requests using the second version of the first model;
    wherein the method is performed by one or more computing devices.

2. The method of claim 1, wherein processing the plurality of content requests comprises:
    for each content request in the plurality of content requests:
        identifying a plurality of content items;
        selecting a single parameter value from among the plurality of parameter values;
        using the second model to generate a score, based on the single parameter value, for each content item in the plurality of content items.

3. The method of claim 2, further comprising:
    storing history data that is generated based on processing the plurality of content requests, wherein the history data indicates a plurality of metric values, each of which corresponds to a different parameter value of the plurality of parameter values, wherein the plurality of metric values includes a first metric value and a second metric value that is different than the first metric value;
    wherein automatically tuning the parameter comprises:
        generating a function based on the history data;
        determining a particular value of the parameter based on the function.

4. The method of claim 3, wherein each metric value of the plurality of metric values is based on a difference between (1) a third value, of the particular metric, that is calculated based on using the parameter value corresponding to said each metric value and (2) a fourth value, of the particular metric, that is calculated for a control group.

5. The method of claim 3, further comprising:
    based on the history data, generating a plurality of functions using a Gaussian process;
    wherein determining the particular value of the parameter is based on the plurality of functions.

6. The method of claim 5, wherein determining the particular value comprises:
    generating a plurality of samples from each function of the plurality of functions;
    wherein determining the particular value is based on the plurality of samples from each function of the plurality of functions.

7. The method of claim 6, wherein the plurality of samples are a second plurality of samples and the plurality of functions are a second plurality of functions, further comprising, prior to generated the second plurality of functions:
    generating a first plurality of functions using the Gaussian process;
    generating a first plurality of samples from each function of the first plurality of functions;
    based on the first plurality of samples, selecting a strict subset of the plurality of parameter values;
    receiving a second plurality of content requests;
    processing the second plurality of content requests based on parameter values in the strict subset;
    generating a portion of the history data based on processing the second plurality of content request;
    wherein the second plurality of functions are based on the portion of the history data.

8. The method of claim 2, further comprising:
    for each content request in the plurality of content requests:
        generating a ranking of the plurality of content items based on the score for each content item in the plurality of content items;
        causing at least a portion of the plurality of content items to be presented in an order that is based on the ranking.

9. The method of claim 2, wherein:
    the plurality of content items comprises a first set of content items of a first type and a second set of content items of a second type that is different than the first type;
    the first model is used to generate a plurality of scores, one for each content item in the first set of content items of the first type, but not for any content item in the second set of content items of the second type;
    each score of the plurality of scores is input to the second model to generate the score for each content item of the plurality of content items.

10. The method of claim 1, further comprising:
    receiving input that specifies a range of values;
    based on the range of values, automatically generating the plurality of parameter values that are within the range of values.

11. The method of claim 1, wherein the particular metric is an average number of impressions per request over multiple requests.

12. One or more storage media storing instructions which, when executed by one or more processors, cause:
    using one or more machine learning techniques to train a plurality of versions of a first model that includes a first version of the first model and a second version of the first model;
    storing a second model that includes a parameter and that accepts, as input, output from the first model;

testing a plurality of parameter values of the parameter of the second model when processing a plurality of content requests using the first and second versions of the first model;

selecting, for the parameter of the second model, a strict subset of the plurality of parameter values such that processing a first subset of the plurality of content requests using the first version of the first model results in a first value of a particular metric that matches a second value of the particular metric resulting from processing a second subset of the plurality of content requests using the second version of the first model.

13. The one or more storage media of claim 12, wherein processing the plurality of content requests comprises:
for each content request in the plurality of content requests:
identifying a plurality of content items;
selecting a single parameter value from among the plurality of parameter values;
using the second model to generate a score, based on the single parameter value, for each content item in the plurality of content items.

14. The one or more storage media of claim 13, wherein the instructions, when executed by the one or more processors, further cause:
storing history data that is generated based on processing the plurality of content requests, wherein the history data indicates a plurality of metric values, each of which corresponds to a different parameter value of the plurality of parameter values, wherein the plurality of metric values includes a first metric value and a second metric value that is different than the first metric value;
wherein automatically tuning the parameter comprises:
generating a function based on the history data;
determining a particular value of the parameter based on the function.

15. The one or more storage media of claim 14, wherein each metric value of the plurality of metric values is based on a difference between (1) a third value, of the particular metric, that is calculated based on using the parameter value corresponding to said each metric value and (2) a fourth value, of the particular metric, that is calculated for a control group.

16. The one or more storage media of claim 14, wherein the instructions, when executed by the one or more processors, further cause:
based on the history data, generating a plurality of functions using a Gaussian process;
wherein determining the particular value of the parameter is based on the plurality of functions.

17. The one or more storage media of claim 16, wherein determining the particular value comprises:
generating a plurality of samples from each function of the plurality of functions;
wherein determining the particular value is based on the plurality of samples from each function of the plurality of functions.

18. The one or more storage media of claim 13, wherein:
the plurality of content items comprises a first set of content items of a first type and a second set of content items of a second type that is different than the first type;
the first model is used to generate a plurality of scores, one for each content item in the first set of content items of the first type, but not for any content item in the second set of content items of the second type;
each score of the plurality of scores is input to the second model to generate the score for each content item of the plurality of content items.

19. The one or more storage media of claim 12, wherein the instructions, when executed by the one or more processors, further cause:
receiving input that specifies a range of values;
based on the range of values, automatically generating the plurality of parameter values that are within the range of values.

20. The one or more storage media of claim 12, wherein the particular metric is an average number of impressions per request over multiple requests.

* * * * *